US011434086B1

(12) United States Patent
Navarria et al.

(10) Patent No.: US 11,434,086 B1
(45) Date of Patent: Sep. 6, 2022

(54) AUTOMATED ITEM REDISTRIBUTION SYSTEMS FOR CONTAINERS

(71) Applicant: Amazon Technologies, Inc., Seattle, WA (US)

(72) Inventors: Filippo Navarria, Milano, MI (US); Vincenzo Acunzo, Torre Annunziata (IT); Tolga Kol, Dudelange (LU); Stefano La Rovere, Bereldange (LU); Xavier Jairo de Abreu de Abreu, Vercelli (IT)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 17/097,726

(22) Filed: Nov. 13, 2020

(51) Int. Cl.
| B65G 47/82 | (2006.01) |
| B65G 47/24 | (2006.01) |
| B25J 5/02 | (2006.01) |
| B65G 47/71 | (2006.01) |

(52) U.S. Cl.
CPC ............. *B65G 47/82* (2013.01); *B25J 5/02* (2013.01); *B65G 47/24* (2013.01); *B65G 47/71* (2013.01); *B65G 2203/0208* (2013.01); *B65G 2203/041* (2013.01); *B65G 2207/42* (2013.01)

(58) Field of Classification Search
CPC ........ B65G 47/82; B65G 47/24; B65G 43/08; B65G 2203/044; B65G 47/71; B25J 5/02
USPC ................................... 198/429, 444, 370.07
See application file for complete search history.

(56) References Cited

U.S. PATENT DOCUMENTS

| 3,416,641 | A | * | 12/1968 | Hollenton | ............... | A24C 1/38 198/418.1 |
| 5,829,222 | A | * | 11/1998 | Schlagel | ............... | B65B 25/008 53/54 |
| 6,751,524 | B2 | * | 6/2004 | Neary | ................... | B65G 43/08 198/444 |
| 8,061,506 | B2 | * | 11/2011 | Schafer | ................. | B65G 43/08 198/444 |
| 8,096,404 | B2 | * | 1/2012 | Eschlbeck | ............. | B65G 47/31 198/429 |
| 8,695,781 | B2 | * | 4/2014 | Mougin | ................. | B65G 47/82 198/431 |
| 9,637,319 | B1 | * | 5/2017 | McCalib, Jr. | ........ | B65G 1/1378 |
| 2018/0169858 | A1 | * | 6/2018 | Jain | ........................ | B07C 5/00 |

* cited by examiner

*Primary Examiner* — James R Bidwell
(74) *Attorney, Agent, or Firm* — Eversheds Sutherland (US) LLP

(57) ABSTRACT

Systems, methods, and apparatuses are disclosed for automated item redistribution systems for containers. In one embodiment, an example system may include a shuttle configured to move adjacent to an array of containers arranged in a first row and a second row, the array of containers including a first container in the first row and a second container in the second row. Example systems may include a first camera configured to image containers in the first row, a second camera configured to image containers in the second row, a first container receptacle portion configured to receive containers, and a rake arm comprising a telescoping portion and a head portion. The head portion may be configured to rotate from a flat position to an angled position. The system may be configured to clear jams in individual containers of the array of containers using the rake arm.

20 Claims, 11 Drawing Sheets

AUTOMATED ITEM REDISTRIBUTION SYSTEMS FOR CONTAINERS

BACKGROUND

As users increasingly make online purchases, fulfilment of such purchases and other orders may become increasingly complicated. For example, a fulfillment center may have output of upwards of one million packages per day. With such demands, efficiency of logistics related to processing orders and packages may be important. In addition, robust handling equipment for objects, such as items, packages, containers, and so forth, may be helpful in improving fulfillment center operations, reducing risk of injury, and other benefits. Moreover, improvements in various operations of order fulfillment, such as improvements to picking technology, sorting technology, packing technology, and so forth may be desired, such that manual efforts can be redirected to different tasks.

Figure 1:
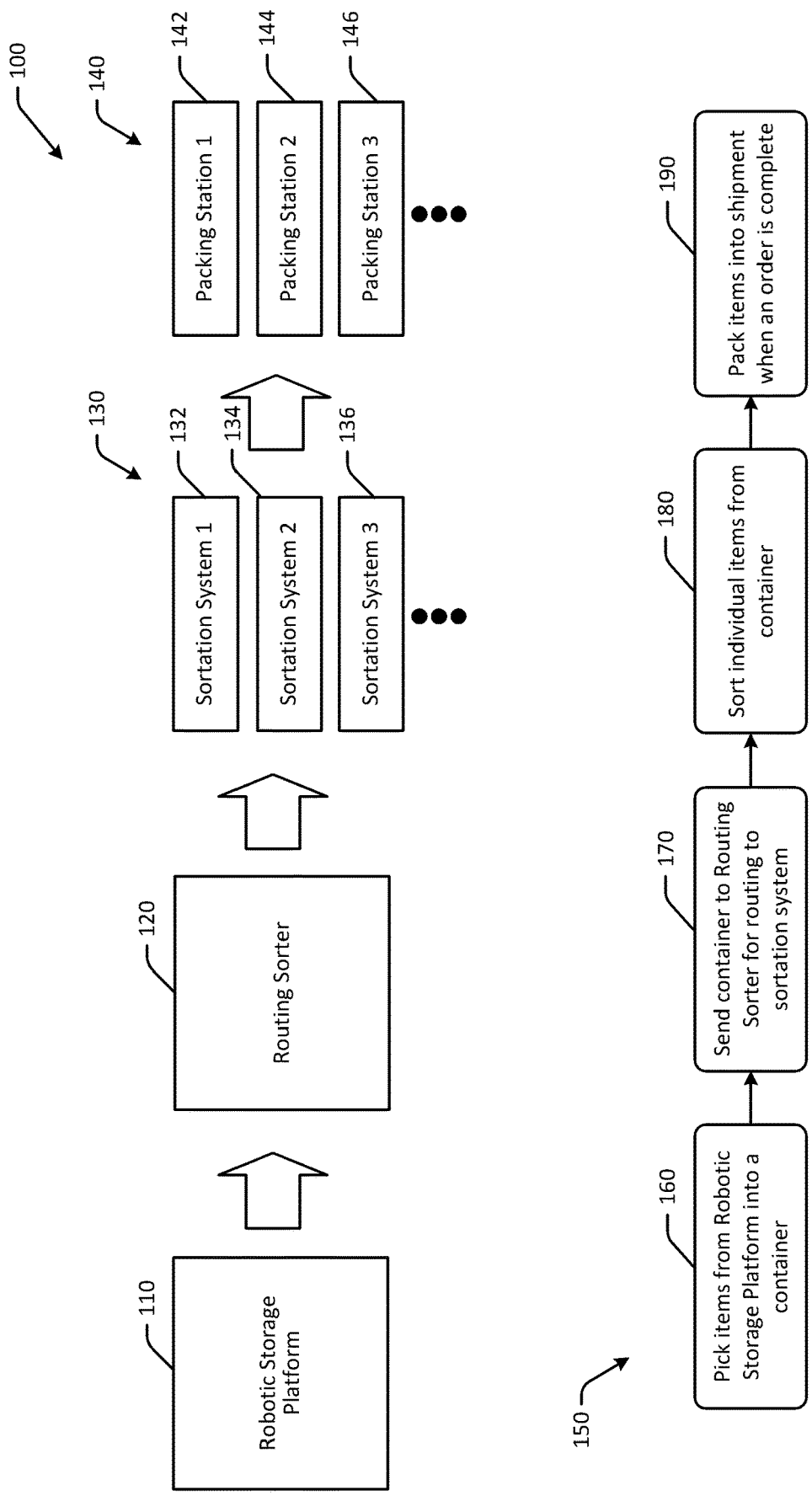
FIG. 1 is a hybrid schematic illustration of an example use case for automated item redistribution systems for containers in a fulfillment center and an example process flow in accordance with one or more embodiments of the disclosure.

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Fulfillment centers may be used to fulfill online purchases and other orders. For example, fulfillment centers may include product inventory that may be pulled when an order for a particular product or multiple products is placed. In some instances, the product(s) may be packed and shipped from the fulfillment center. However, the process of obtaining the product(s), packing the product(s), and shipping the product(s) may be complicated due to the amount of inventory, the number of orders to process, the size of the fulfillment center, and/or other factors. In addition, a portion of the fulfillment center designated for packing or shipping may be different than the portion of the fulfillment center designated for holding product inventory. As a result, transportation of products in an order may be time consuming. In addition, handling of containers that may have items inside, such as totes, bins, and other containers, may be difficult.

In some instances, orders for products may include multiple items. For example, a user may place an order for two or more products. In such instances, the products that are ordered may not be in the same location of the fulfillment center, or one of the products may take a longer time to obtain or pick than the others. As a result, packing of the order may be delayed until all of the items in the order are ready for packing. To improve the speed of processing orders, in certain instances, robots and other technology may be deployed, such that manual efforts can be redirected to other tasks. For example, robots may be used to assist with locating products in an order during a pick process. However, directing picked products to the appropriate packing station and/or location may form a bottleneck in the operation of the fulfillment center. For example, after products are picked, the products may be placed in a container, such as a tote or other container, and directed to sortation machines to direct the picked products to the appropriate packing location. For example, products in the same order may be directed to the same packing location for consolidation and subsequent packing. However, a tote or other container may include products that are to be sorted to multiple different packing locations, and the sortation process may be slowed by sheer volume of products that are to be processed and/or sorted. In addition, as items are deposited into containers, there is a risk of jams being created depending on the orientation and/or positioning of an item that has been deposited into a container. For example, items may protrude out from a top of the container, items may pile up on one side of a container or may otherwise be unevenly distributed, and so forth. Such uneven distribution of items and other jams may be undesired.

In addition, handling and transport of containers, such as totes that are empty or have objects (e.g., items, packages, etc.) inside, may be difficult to perform using robotic components or other automated tools. For example, grasping a container in which an item is present may be difficult due to movement of the item (thereby causing a change to the center of gravity of the container, etc.) and/or other factors when using automated tools. Moreover, establishing control over a container in motion may be difficult when using automated tools. For example, as the container is moved, ensuring that the container and its contents (if applicable) arrive at a destination intact may be difficult when automated tools are used instead of manual effort. Although humans may be able to effectively handle and transport containers, automated tools may present challenges due to the complexity of the operations involved during retrieval, transport, and/or delivery of a container.

Embodiments of the disclosure include methods and systems for automated item redistribution systems for containers that may be used to automatically clear jams in containers caused by items deposited into the container, and also to redistribute items in a container into a substantially even or relatively less uneven distribution, so as to avoid slowdowns caused by jams, and to allow for increased utilization of container space via a more even distribution of items in the container. To automatically redistribute items in containers and to automatically clear jams, embodiments may include a shuttle having one or more cameras and one or more rake arms. The shuttle may be configured to detect a jam or an uneven item distribution inside an open-top container using image data from the camera(s), and may subsequently clear jams and/or redistribute items in the container using the rake arm. For example, the rake arm may be configured to extend, rotate a head, and retract, thereby clearing the jam and avoiding the need for manual intervention. Some embodiments may be configured to remove full containers automatically, and to replace the full containers with empty containers, providing an additional benefit and further reducing manual interaction.

Referring to FIG. 1, an example use case 100 for automated item redistribution systems for containers and an example process flow in accordance with one or more embodiments of the disclosure. Although discussed in the context of online orders, other embodiments may be directed to any suitable use case where items, such as products, packages, or other items, are picked and/or sorted, such as instances where users may pick up orders rather than receiving a shipment.

In FIG. 1, a fulfillment center may include a robotic storage platform 110, a routing sorter 120, one or more sortation systems 130, and one or more packing stations 140. The robotic storage platform 110 may be a portion of the fulfillment center at which products picked from product inventory are placed. Robots may be used to pick products from inventory and to deliver to the robotic storage platform in some instances, while in other instances, manual operators or a combination thereof may be used to pick products. The picking process at the robotic storage platform may include locating a product in an order, obtaining the product, and sending the product to the robotic storage platform 110, such as via a conveyor belt (e.g., smooth belt, cleated belt, etc.). In the illustrated embodiment, products at the robotic storage platform 110 may be placed in a container, such as a tote.

At the routing sorter 120, totes including products that have been picked may be routed to an appropriate or designated sortation system. For example, the routing sorter 120 may determine an identifier associated with the tote, and may determine the sortation system associated with the tote using the identifier. The routing sorter 120 may route or direct the tote to the appropriate sortation system. In other embodiments, totes may not be associated with particular sortation systems.

The sortation systems 130 may include one or more sortation system machines. In FIG. 1, a first sortation system 132, a second sortation system 134, a third sortation system 136, and so forth may be included. Any number of sortation systems may be included. Some or all of the sortation systems may be associated with certain totes, certain functions, certain geographic regions, and so forth. The sortation systems may be used to consolidate or otherwise aggregate products for single or multi-item orders. For example, a first tote may include a first item of a multi-item order, and a second tote may include a second item of the multi-item order. The sortation system may therefore identify the orders associated with the respective products in a tote, and may transport the products to a container, such as a bin, associated with the order. When the order is complete with all of the products in the associated bin, the order may be packed. Accordingly, a specific sortation system may be designated for fulfillment of a particular order. At the sortation systems 130, totes that are received via the routing sorter 120 may be emptied, and the products in the respective totes may be transported to the appropriate bins for the orders for which the products were picked.

After a single or multi-item order is complete (e.g., the sortation system has delivered all of the products in the order to the appropriate bin, etc.), the order may be packed at the packing station 140. In some embodiments, one or more packing stations may be included. In some instances, a packing station may service more than one sortation system, while in other instances, more than one packing station may service one sortation system. In the illustration of FIG. 1, a first packing station 142 may be used to pack orders from the first sortation system 132, a second packing station 144 may be used to pack orders from the second sortation system 134, a third packing station 146 may be used to pack orders from the third sortation system 136, and so forth. At the packing stations 140, the orders may be placed into boxes and sealed for subsequent shipment. The packages may then be processed for shipment to the user. In other instances, the sortation systems 130 may be used to sort packages designated for different geographic regions, and may therefore output packages to different loading docks, etc. The sortation systems 130 may be used for additional sortation purposes.

At the fulfillment center, an example process flow 150 illustrated in FIG. 1 may be implemented to improve the efficiency and/or throughput of the fulfillment center. At a first block 160, items may be picked from the robotic storage platform 110 into a container, such as a tote. At a second block 170, the tote may be sent to the routing sorter 120 for routing to a sortation system. At a third block 180, the items from the tote may be sorted from the container by the sortation system. At a fourth block 190, the items may be packed into a shipment when all of the items in the order are sorted or when an order is complete.

Figure 2:
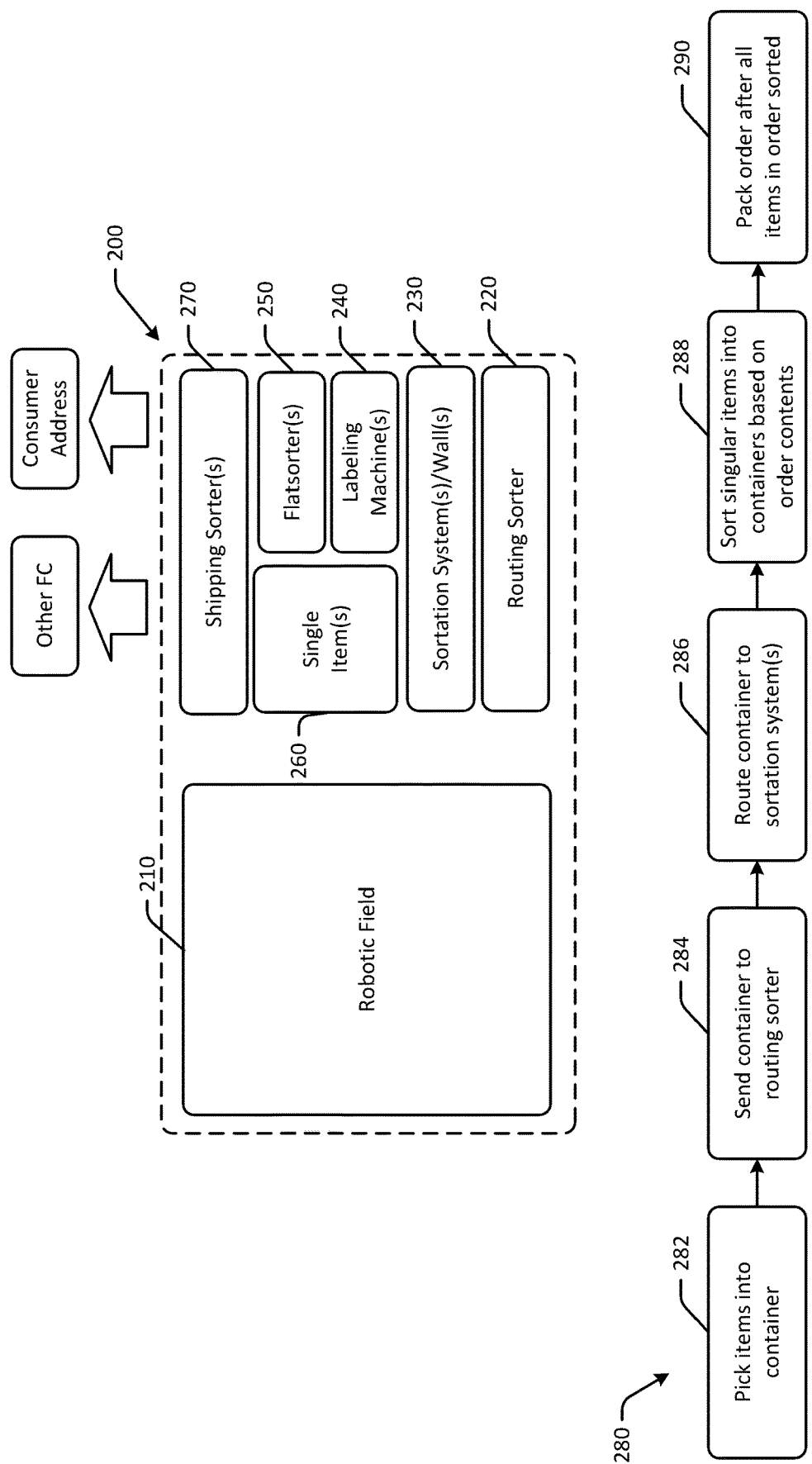
FIG. 2 is a hybrid schematic illustration of an example use case for automated item redistribution systems for containers in a fulfillment center and an example process flow in accordance with one or more embodiments of the disclosure.

FIG. 2 is a hybrid schematic illustration of an example use case for automated item redistribution systems for containers and an example process flow in accordance with one or more embodiments of the disclosure. Other embodiments may include additional or fewer components.

In FIG. 2, an example layout of a fulfillment center 200 is depicted. The fulfillment center 200 may include a robotic field 210 at which product inventory may be stored for picking, one or more routing sorters 220 that may be used to route containers or other items to certain sortation systems, one or more sortation systems or walls 230 that may be used to sort single or multi-item orders, one or more single item sections 260 that may be used to pack single item orders, one or more labeling machines 240 that may be used to apply shipping labels to packages, one or more flat sorters 250 and shipping sorters 270 to sort labeled shipments (e.g., by destination, carrier, etc.) for pickup from the fulfillment center 200. For example, output from the fulfillment center 200 may include containers of items routed to other fulfillment centers, packages addressed to consumer addresses, and so forth.

The fulfillment center 200 may implement a process flow 280 for processing single or multi-item orders. At a first block 282, items for different orders may be picked into a tote or container that may be sent to a sorting machine, such as one of the sortation systems 230. The tote may include items from any order that is being consolidated by the specific sortation system machine. The sortation system may sort singular items into single or multi-item orders. At a second block 284, the tote may be sent to a routing sorter. At a third block 286, the routing sorter may route or divert the tote to any sortation or an assigned sortation system (e.g., the sortation system that is consolidating items for a particular order for multi-order instances, etc.). At a fourth block 288, the sortation system may sort singular items from the tote or container into a different tote or container based on the order contents. For example, the containers at the sortation system may be assigned to a particular order that may be single or multi-item. At a fifth block 290, the order may be packed after all items in the order are sorted.

The sortation machines 230 may include bins or containers of different sizes (e.g., small, medium, large, etc.) and may be configured, in one example, to handle items that weigh up to twenty or more pounds. The totes (or other containers) may be stored at angles, such as inclined angles, that may help avoid buildup of items on a particular side of the tote. In some embodiments, the sortation machines 230 may include multiple chutes, and may be configured to sort items at a rate of about 3,600 units per hour. In some instances, the sortation machines 230 may have two inductors (e.g., one on each side, etc.) for inducting items from containers, and may be modular.

In some embodiments, the sortation machines 230 may replace other processes, such as manual processes. For example, manual induction of products from a tote to a sorter machine may be a bottleneck that is avoided by the systems and methods described herein. The sortation system 230 may include cross-belt shuttles that sort singulated products into containers or totes. Sortation systems 230 may be capable of sorting at a rate of 3,600 units per hour. Certain sortation system machines 230 may be configured to handle items of up to twenty pounds, or more in some instances (e.g., 100 pounds or more), with dimensions of about 18"×14"×8" or 28"×14"×9", which may cover almost all products at the fulfillment center 200. The sortation system 230 may operate as a high-speed, high-destination sort solution that intakes items or packages and sorts them into containers using a shuttle that travels vertically and horizontally inside the machine (or outside in some instances).

Individual sortation systems may be item sorting systems, and may include a number of, such as two or more, modular sorting machines coupled in series, or otherwise adjacent to each other and connected. The modular sorting machines may include a first modular sorting machine. The modular sorting machines may be configured to singulate items from a tote comprising a plurality of items into a plurality of bins (e.g. induct individual items from a bin that has multiple items, and place the inducted items into the appropriate bin, where bins are associated with single or multi-item orders. The tote from which items are inducted may be associated with the individual sortation system machine (e.g., the modular sorting machines that form the individual sortation system machine, etc.).

Accordingly, in some embodiments, sortation systems may be arranged in rows and may receive assigned totes from a routing sorter, thereby streamlining fulfillment center operation and reducing labor and space costs. The sortation systems may process totes for multi-order sortation and consolidation. As a result, there may no longer be a need to singulate and send items to a wall for manual extraction, because each tote may be assigned to a particular sortation system machine. Induct stations can be replaced with sortation system machines.

In another embodiment, pickers may pick items directly to a segmented belt conveyor at a station that is near a sortation system machine. Other nearby pick stations may also pick items directly to conveyance for the same sortation system machine. Picked items being transported to a single sortation system machine may merge together to be inducted into their unique sortation system machine, where multi-item orders may be consolidated and sent to packing.

Embodiments of the disclosure include automated item redistribution systems for containers. Certain embodiments may improve processing speed and/or throughput of fulfillment centers. Certain embodiments may improve performance of mechanical equipment for sortation and/or consolidation of items for single or multi-item orders. While described in the context of online orders, aspects of this disclosure are more broadly applicable to other forms of product sortation.

Example embodiments of the disclosure provide a number of technical features or technical effects. For example, in accordance with example embodiments of the disclosure, certain embodiments of the disclosure may improve processing speed, throughput, and/or efficiency of fulfillment centers. The above examples of technical features and/or technical effects of example embodiments of the disclosure are merely illustrative and not exhaustive.

One or more illustrative embodiments of the disclosure have been described above. The above-described embodiments are merely illustrative of the scope of this disclosure and are not intended to be limiting in any way. Accordingly, variations, modifications, and equivalents of the embodiments disclosed herein are also within the scope of this disclosure. The above-described embodiments and additional and/or alternative embodiments of the disclosure will be described in detail hereinafter through reference to the accompanying drawings.

Illustrative Embodiments and Use Cases

Figure 3:
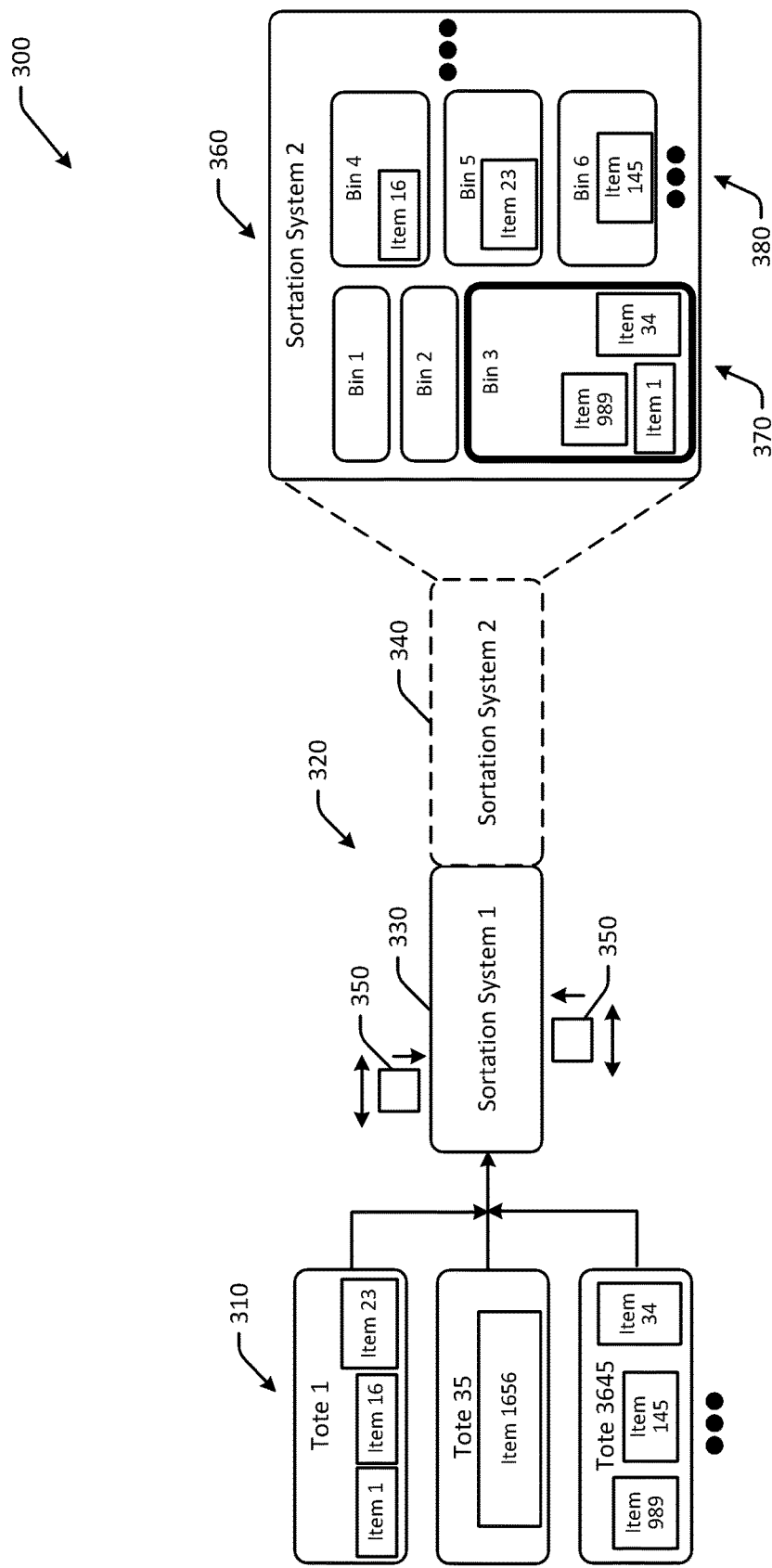
FIG. 3 is a schematic illustration of an item sorting system that may be used in conjunction with an automated item redistribution system for containers in accordance with one or more embodiments of the disclosure.

FIG. 3 is a schematic illustration of an item sorting system that may be used in conjunction with an automated item redistribution system for containers in accordance with one or more embodiments of the disclosure. Other embodiments may include additional or fewer components. The illustration of FIG. 3 is not to scale, and may not be illustrated to scale with respect to other figures. The sortation system illustrated in FIG. 3 may be the same sortation system discussed with respect to FIGS. 1-2.

In FIG. 3, an example use case 300 including a set of totes 310 and item sorting system(s), or sortation system(s) 320, is depicted. The set of totes 310 may include one or more totes that may be optionally be assigned to, or otherwise associated with, the sortation system 320. For example, Tote 1, Tote 35, Tote 3645, and so forth may be associated with the sortation system 320. The totes may have identifiers, such as alphanumeric or other identifiers. The totes may be used to place items that have been picked into the totes. The items that are placed in the totes may be associated with orders that are to be consolidated by the sortation system 320. For example, Tote 1 may include item 1, item 16, and item 23, Tote 35 may include item 1656, Tote 3645 may include item 989, item 145, and item 34, and so forth. The item sorting system, or the sortation system 320, may be configured to receive items from a tote that includes one or more, such as multiple items, and the tote may be routed to the item sorting system or the sortation system 320.

The totes 310 may be directed to the sortation system 320 for sorting and consolidation. For example, items in the totes 310 may be inducted into the sortation system 320 via a conveyor belt.

The sortation system 320 may include one or more modules, and may be adjusted in size by adding or removing modules or standalone sortation systems as needed. For example, the sortation system 320 may include a first sortation system 330 and a second sortation system 340. The second sortation system 340 may be coupled to the first sortation system 330, or may be a standalone sortation system.

The respective sortation systems 330, 340 may include one or more bins, or containers that hold items of a single or multi-item order. For example, as illustrated in side view 360, the second modular item sorting machine 340 may include a first chute 370, or vertical stacking, of bins, and a second chute 380 of bins. The bins in the respective chutes may be of different sizes or dimensions, or may be placed in different vertical locations along the chute. The containers may be stored at angled positions. The sortation system 320 may include a plurality of bins disposed in an array along one or more sides of the first modular item sorting machine 330 and the second modular item sorting machine 340. The respective bins may be configured to be repositioned within different chutes and/or at different vertical locations. In FIG. 3, Bin 1 and Bin 2 may have the same height, while Bin 3 in the same column or chute may have a different height. Any suitable number of bins may be included in a chute and/or array.

Items or products inducted from the totes 310 may be sorted and directed to a bin associated with the order for which the item was picked. The items may be transported by one or more shuttles or mobile carrier units 350, which may move in one or more directions within the sortation system 320. In some embodiments, the shuttles or mobile carrier units 350 may be positioned outside of the sortation system 320. In some embodiments, the sortation system(s) 320 may include one or more mobile carrier units 350 or other shuttles that can be used to move items, such as products, packages, containers, and so forth. Mobile carrier units 350 may include one or more RFIDs that can be used to retain traceability of an item to a carrier, such that the entire system may not have to be purged in case of a complete power loss. The lineage or traceability can be established by associating a barcode or other identifier of the item with the carrier RFID tag at the point of induction or elsewhere.

For example, Item 1 may be inducted from Tote 1 and placed in Bin 3, along with Item 989 and Item 34 from Tote 3645. Bin 3 may be associated with an order that included those three items, and may therefore be ready for packing. Similarly, Item 16 may be routed to Bin 4, Item 23 may be routed to Bin 5, Item 145 may be routed to Bin 6, and so forth. Any number of bins, totes, and/or modules may be included.

In some embodiments, the bins or other containers of FIG. 3 may be disposed in an automated item redistribution system for containers that may be coupled to, but not a part of, the item sortation system 320. For example, in some embodiments, the bins may be disposed in a container array that has individual container slots, where the container array is coupled to a side of the item sortation system 320. In other embodiments, the containers and/or container array may be integrated with the item sortation system 320.

Figure 4:
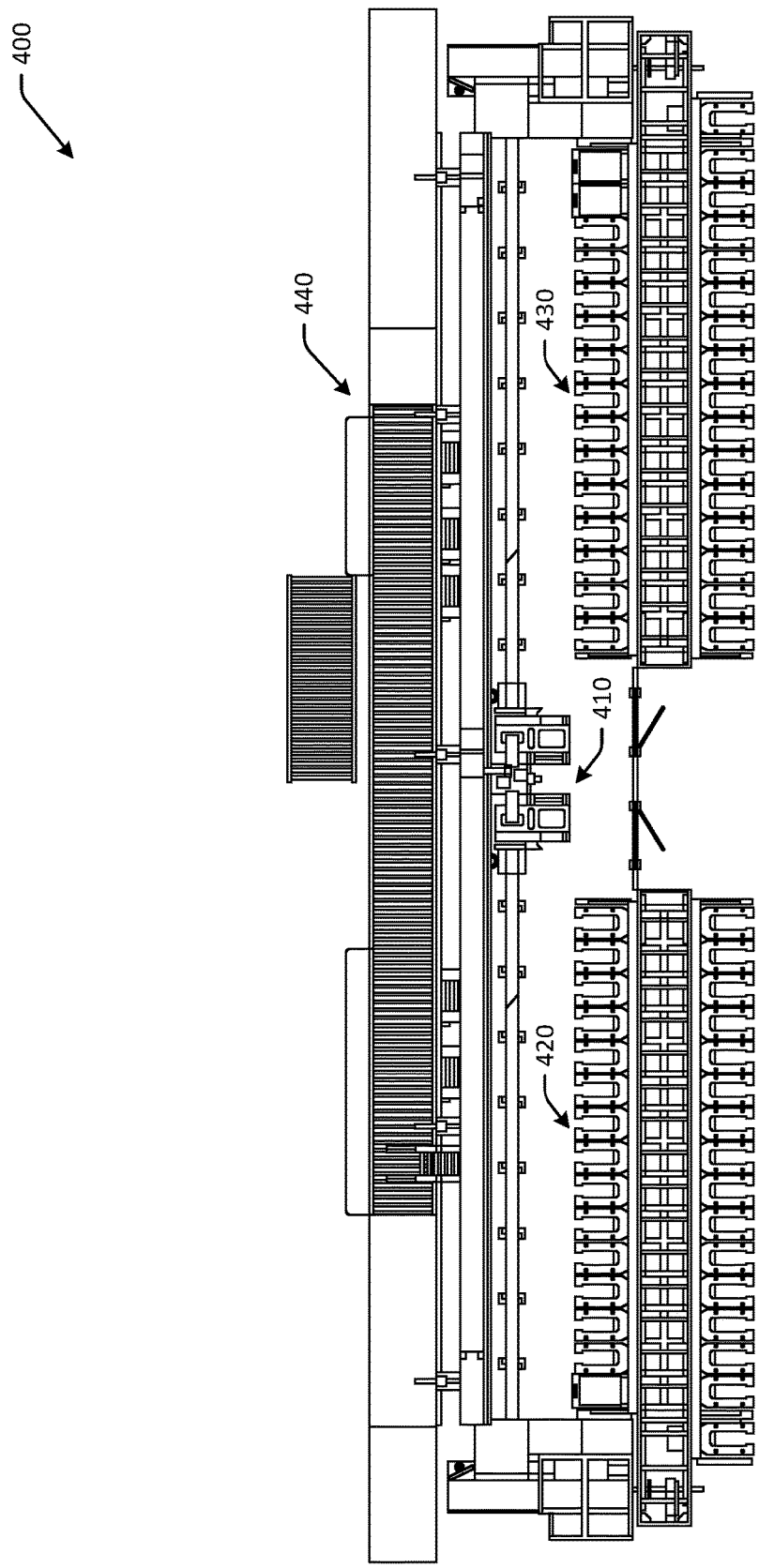
FIG. 4 is a schematic illustration of a top view of an item sorting system and automated item redistribution system for containers in accordance with one or more embodiments of the disclosure.

FIG. 4 is a schematic illustration of a top view 400 of an item sorting system and automated item redistribution system for containers in accordance with one or more embodiments of the disclosure. Other embodiments may include additional or fewer components. The illustration of FIG. 4 may not be to scale, and may not be illustrated to scale with respect to other figures. The automated item redistribution system illustrated in FIG. 4 may be the same automated item redistribution system discussed with respect to FIGS. 1-3.

In FIG. 4, a shuttle 410 may be part of the automated item redistribution system. The shuttle 410 may be configured to detect and remove full containers from one or more container matrices, such as a first container matrix 420 and/or a second container matrix 430. For example, one or more item sortation systems may sort items into one or more containers disposed in individual container slots of the first container matrix 420 and/or the second container matrix 430. Depending on whether the sortation process is for individual orders, fulfillment center transfer, or another application, the items may fill individual containers over time. For example, in a fulfillment center transfer application, containers may be filled to a full capacity and then shipped to a different fulfillment center. In an individual order application, items for a particular order may be sorted into a container, which may or may not be full depending on the size of items, the number of items, and so forth.

The first container matrix 420 and/or the second container matrix 430 may be individual modular rack systems that include one or more vertically spaced or horizontally spaced levels, where some or all of the levels may include container slots. The first container matrix 420 and/or the second container matrix 430 may house containers, such as totes, bins, bags, or other containers, that can be used to hold sorted items, such as items that correspond to certain orders. The containers may be stored at one or more different angles. The first container matrix 420 and/or the second container matrix 430 may individually include an array of containers with removable and/or rearrange-able container configurations. The containers may be of the same or different dimensions.

The shuttle 410 may operate by automatically detecting a full container using one or more cameras, and automatically removing full containers from the container matrix. The shuttle 410 may include one or more modules. For example, the shuttle may include a full container module configured to retrieve and handle full containers, and a replenishment module configured to handle empty containers that can be used to replace full containers in the container matrix, so as to minimize delay in sortation system operation during container replacement. The shuttle 410 may be configured to move laterally along one or more rails adjacent to the first container matrix 420 and/or the second container matrix 430. The shuttle 410 may further be configured such that the individual modules can move (either independently or in tandem) vertically along a frame, so as to provide access to more than one row of containers in the first container matrix 420 and/or the second container matrix 430. During operation, the shuttle 410 may be configured to retrieve a full container from the container matrix using a container gripper, such as an automated handle that lifts the container into a horizontal orientation and pulls the container outwards onto a conveyor, as described with respect to FIG. 5. The shuttle 410 may then place an empty conveyor into the empty container slot created by the removal of the full container, while at the same time or shortly thereafter pushing the full container onto a takeaway conveyor 440 for downstream processing. In some embodiments, a number of empty replacement containers may be disposed on a portion of the takeaway conveyor 440 that is blocked or static, such that the replenishment module can be reloaded with an empty container at the same time, or shortly after, the full container is pushed onto the takeaway conveyor 440.

As items are sorted into containers, the possibility of jams occurs as items are deposited into chutes that lead to individual containers. For example, a long, rectangular item may slide down the chute and enter the container in a vertical orientation, thereby causing a jam and/or otherwise interfering with other items destined for the same chute and/or container. In addition, as items are deposited into the container, some items may pile up on one side of the container, which may not cause immediate jams, but which may cause a backup of items as items are deposited into the container. This may be particularly problematic for applications where containers are to be filled to a full capacity, such as for fulfillment center transfer applications.

To prevent these issues from occurring, the shuttle 410 may include one or more rake arms that may be used to move items in containers or protruding from containers. For example, using the one or more cameras, the shuttle 410 may be configured to detect jams in containers (e.g., items backed up on a chute leading to a container, items protruding from a container, etc.) and/or items unevenly distributed in a container, and may using the one or more rake arms to extend over the container, rotate a head of the rake arm, and retract, thereby clearing jams and/or moving items to create a relatively more even item distribution inside the container. The rake arms may be a part of the full container module of the shuttle 410, or the replenishment module in some embodiments, or may be included in both modules in other embodiments. The one or more rake arms may therefore move items blocked that failed to be delivered. In one embodiment, the rake arm may include a telescopic arm that, in its extended position, reaches the item blocked on the chute and brings the item into the container. The rake arm may have a head with a 60 degree rotation about a hinge on an end of the arm tool that is configured to engage the item.

Some embodiments may include one or more two-dimensional or three-dimensional cameras mounted to the shuttle 410 and configured to image inside and/or adjacent to one or more containers. For example, the shuttle 410 may include one or more cameras at fixed vertical locations that correspond to rows of containers at the container matrix. Thus, as the shuttle 410 moves laterally along the rails, the cameras can visualize contents of containers in the different respective rows at the same time. For example, a first camera at a first fixed height may visualize containers in a top row, a second camera at a second fixed height may visualize containers in a middle row, a third camera at a third fixed height may visualize containers in a bottom row, and so forth.

In one embodiment, the shuttle 410 may be part of a container monitoring system. The container monitoring system may optionally include an item sortation machine having an array of containers arranged in a first row and a second row, where the item sortation machine delivers items to individual containers using respective chutes aligned with the individual containers. The individual containers may be disposed in the first container matrix 420 and/or the second container matrix 430. The shuttle 410 may be configured to translate adjacent to an exterior side of the item sortation machine(s). The system may include a first camera configured to image containers in a first row of a container matrix, and a second camera configured to image containers in a second row of a container matrix. The system may include a first module or a first container receptacle portion configured to receive containers. The first module or first container receptacle portion may include an upper portion, a container pulling mechanism disposed at a middle of the upper portion of the first container receptacle portion, the container pulling mechanism configured to pull individual containers out of the array of containers. The system may include a rake arm having a telescoping portion and a head portion, where the telescoping portion is configured to extend over a container in the array of containers, and the head portion is configured to rotate from a flat position to an angled position, such as to an angle of up to about 60 degrees relative to horizontal. The rake arm may be disposed adjacent to the container pulling mechanism and may therefore be offset from the middle or center of the upper portion. The container monitoring system is therefore configured to clear jams in individual containers of the array of containers using the rake arm.

Figure 5:
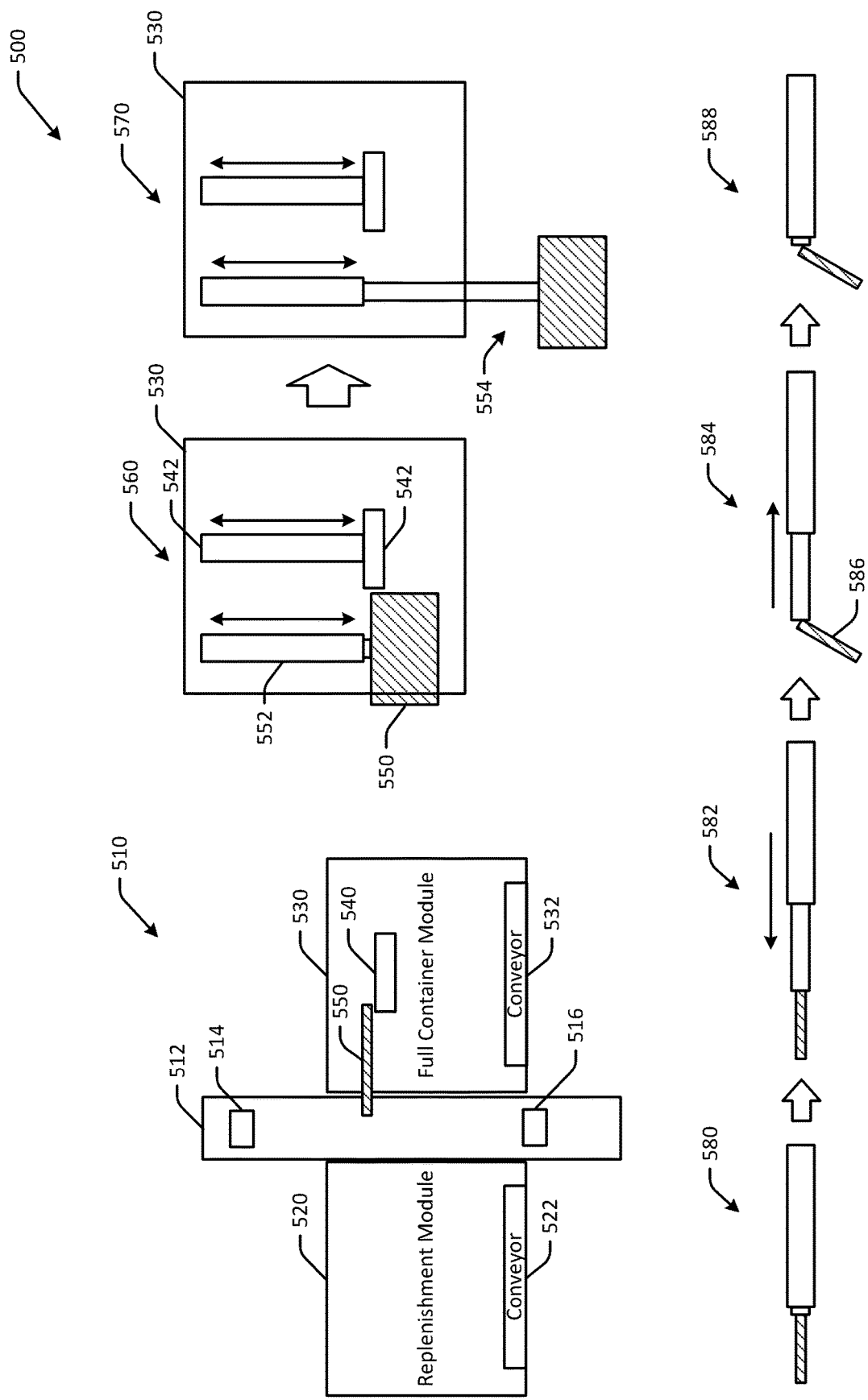
FIG. 5 is a schematic illustration of various views of an automated item redistribution system for containers and a rake arm in various positions in accordance with one or more embodiments of the disclosure.

FIG. 5 is a schematic illustration of various views of an automated item redistribution system for containers and a rake arm in various positions in accordance with one or more embodiments of the disclosure. Other embodiments may include additional or fewer components. The illustration of FIG. 5 may not be to scale, and may not be illustrated to scale with respect to other figures. The automated item redistribution system illustrated in FIG. 5 may be the same automated item redistribution system discussed with respect to FIGS. 1-4.

The system may be a container monitoring system 500 and may include a shuttle 510. The container monitoring system 500 may include a frame 510 along which the shuttle 510 may move vertically. The shuttle 510 may be configured to move adjacent to an array of containers arranged in a first row and a second row, where the array of containers includes a first container in the first row and a second container in the second row.

The container monitoring system 500 may include a number of cameras coupled to the frame 512. For example, the container monitoring system 500 may include a first camera 514 configured to image containers in the first row, and a second camera 516 configured to image containers in the second row. The cameras 514, 516 may have fixed positions relative to the frame 512, such that the cameras may move laterally with the shuttle 510, but not vertically along the frame 512.

The shuttle 510 may include a first container receptacle portion 530 configured to receive containers, and a second container receptacle portion 520 configured to receive containers. The second container receptacle portion 520 may be disposed adjacent to the first container receptacle portion 530. In some embodiments, the shuttle 510 may include a U-shaped or rectangular bracket coupled to the frame 512 of the shuttle 510 and positioned between the first container receptacle portion 530 and the second container receptacle portion 520. The first camera 514 and the second camera 516 may optionally be coupled to the U-shaped bracket.

The first container receptacle portion 530 may be a full container module or a full container portion, and may be configured to handle full containers. The second container receptacle portion 520 may be a replenishment module or a replenishment portion, and may be configured to handle empty containers. In other embodiments, the respective modules may be on different sides. The first container receptacle portion 530 may include a first conveyor 532 to assist with loading and unloading full containers, and the second container receptacle portion 520 may include a second conveyor 522 to assist with loading and unloading empty containers.

The shuttle 510 may include a container pulling mechanism 540 coupled to the first container receptacle portion 530. The container pulling mechanism 540 may be a hook, handle, or other mechanism configured to engage with a handle or other structure on a container, and may be used to lift and/or pull the container onto the conveyor 532.

The container monitoring system 500 may include a rake arm 550 used to clear jams and/or redistribute items in a container. The rake arm 550 may be coupled to the first container receptacle portion 530 of the shuttle 510. The first container receptacle portion 530 may include an upper portion, and the container pulling mechanism 540 may be disposed at or near a middle of the upper portion of the first container receptacle portion 530. The container pulling mechanism 540 may be configured to pull individual containers out of the array of containers. The rake arm 550 may be disposed adjacent to the container pulling mechanism 540, and may therefore be offset from a center or the middle of the upper portion. A width of the head portion of the rake arm 550 may be equal to or greater than half a width of the first container in some embodiments. The head portion may be formed of at least one of: a rubber flap, brush bristles, or a composite material.

As depicted in top schematic view in a retracted position 560, the rake arm 550 may include a telescoping portion 552 and a head portion, where the telescoping portion 552 is configured to extend over a container in the array of containers, and the head portion is configured to rotate from a flat position to an angled position. The system may be configured to clear jams in individual containers of the array of containers using the rake arm 550. Similarly, the container pulling mechanism 540 may include a telescoping arm 542 that allows the container pulling mechanism 540 to extend and retract in a linear manner. As depicted in top schematic view in an extended position 570, the rake arm 550 may extend such that the head portion is disposed over a container and/or adjacent to a chute, and the head portion can rotate about joint 554 to contact items causing a jam.

Extension and retraction of the rake arm 550 is depicted in sequential drawings in cross-sectional view in FIG. 5. At a first instance 580, the rake arm 550 may be in a retracted position. At a second instance 582, the rake arm 550 may extend to the extended position. At a third instance 584, the head portion 588 of the rake arm 550 may rotate to an angled position. At a fourth instance 588, the rake arm 550 may retract to the retracted position while the head portion 588 is in the angled position, so as to clear a jam by moving items in the path of the head portion.

Figure 6:
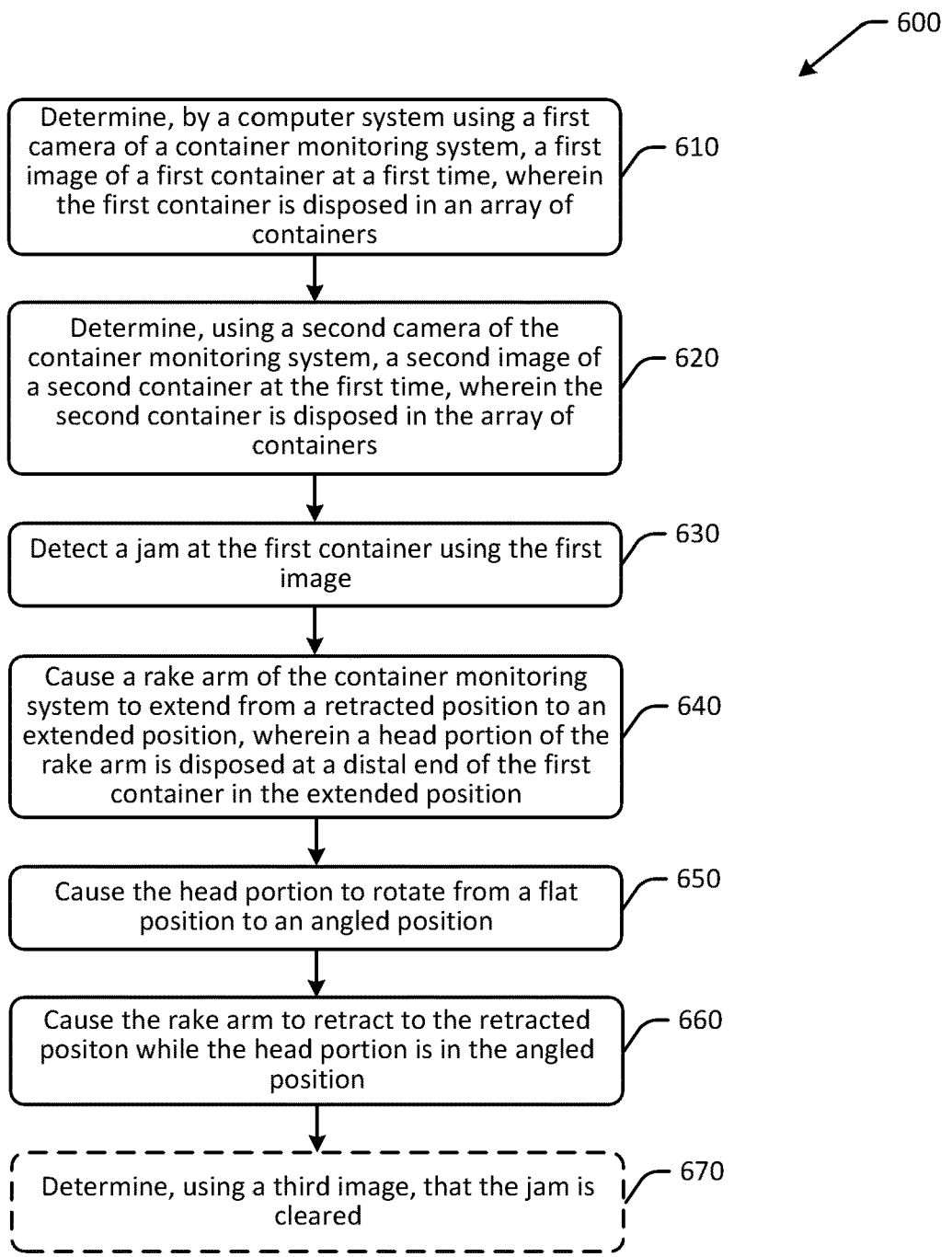
FIG. 6 is a schematic illustration of an example process flow for automated item redistribution for containers in accordance with one or more embodiments of the disclosure.

FIG. 6 is a schematic illustration of an example process flow 600 for automated item redistribution in accordance with one or more embodiments of the disclosure. One or more of the blocks illustrated in FIG. 6 may be performed in a different order or across a distributed environment. In some embodiments, the operations of process flow 600 may be performed by a controller or computer system in communication with one or more sortation systems.

At block 610, a first image of a first container at a first time may be determined by a computer system using a first camera of a container monitoring system, where the first container is disposed in an array of containers. For example, a computer system or controller having one or more computer processors coupled to memory and configured to execute computer-executable instructions may be in communication with a first camera, and may be configured to determine a first image of a first container at a first time. The first container may be disposed in an array of containers, such as in a container matrix of an item sortation system. The computer system may determine the first image of the first container using the first camera. Image data output from the first camera may be used to determine contents of the first container, a fullness level of the first container, whether any jams are present at the first container or corresponding chute, an approximate distribution of items in the container, and/or other metrics for the first container. Image processing algorithms, such as object recognition processing, may be used in conjunction with the image data to determine various conditions of the first container, such as whether a jam is present or likely to occur. The first image may be periodically imaged, or imaged at different points in time, so as to provide monitoring of the various metrics of the first container as it is filled.

At block 620, a second image of a second container at the first time may be determined by a computer system using a second camera of a container monitoring system, where the second container is disposed in the array of containers. For example, a computer system or controller having one or more computer processors coupled to memory and configured to execute computer-executable instructions may be in communication with a second camera, and may be configured to determine a second image of a second container at the first time. This may be because the first camera and the second camera are vertically spaced so as to image containers in different rows. The second camera may therefore capture the second image at the same time as the first image is captured by the first camera. The second container may be disposed in the array of containers, such as in a container matrix of an item sortation system. The computer system may determine the second image of the second container using the second camera. Image data output from the second camera may be used to determine contents of the second container, a fullness level of the second container, whether any jams are present at the second container or corresponding chute, an approximate distribution of items in the container, and/or other metrics for the second container. Image processing algorithms, such as object recognition processing, may be used in conjunction with the image data to determine various conditions of the second container, such as whether a jam is present or likely to occur.

At block 630, a jam may be detected at the first container using the first image. For example, a computer system or controller having one or more computer processors coupled to memory and configured to execute computer-executable instructions may be configured to detect a jam at the first container using the first image. The first image may be processed using various computer vision techniques to identify or otherwise determine the presence of a jam. A jam may be defined as a threshold imbalance in item distribution inside the container, the presence of an item adjacent to a chute leading to the container, a buildup of items on one side of the container, a buildup of items on the chute leading to the container, and/or other positioning of items that indicates the presence of a jam or a jam is likely to occur.

At block 640, a rake arm of the container monitoring system may be caused to extend from a retracted position to an extended position, where the head portion of the rake arm is disposed at a distal end of the first container in the extended position. For example, a computer system or controller having one or more computer processors coupled to memory and configured to execute computer-executable instructions may be configured to cause a rake arm of the container monitoring system to extend from a retracted position to an extended position, where the head portion of the rake arm is disposed at a distal end of the first container in the extended position. The rake arm may include a telescoping arm that allows for a head of the rake arm to be extended towards the jam. In some embodiments, the telescoping arm portion of the rake arm may move in a linear manner (e.g., back and forth, etc.). The rake arm may be caused to be extended from a retracted position to an extended position. The head portion of the rake arm may extend to a position adjacent to the distal end of the first container in the fully extended position.

At block 650, the head portion of the rake arm may be caused to rotate from a flat position to an angled position. For example, a computer system or controller having one or more computer processors coupled to memory and configured to cause the head portion of the rake arm to rotate or otherwise move from a horizontal or flat position to an angled position. In some embodiments, the rotation to the angled position may be about 45 degrees, about 60 degrees, about 90 degrees, or another degree movement. Rotation may be dynamic based at least in part on an object that is being cleared by the rake arm.

At block 660, the rake arm may be caused to retract to the retracted positon while the head portion is in the angled position. For example, a computer system or controller having one or more computer processors coupled to memory and configured to cause the rake arm to retract to the retracted positon while the head portion is in the angled position. By retracting while the head portion is in the angled position, the head portion may contact one or more items causing a jam or that are to be otherwise reoriented, and may pull the items away from the distal end of the container. In addition, items may be redistributed in the container as items are pulled from the distal end of the container towards a proximal end of the container.

At optional block 670, it may be determined that the jam is cleared using a third image. For example, a computer system or controller having one or more computer processors coupled to memory and configured to cause the first camera to capture a third image after the rake arm has been retracted. The third image may be processed using various computer vision techniques to identify or otherwise determine whether the jam is still present and/or whether an item distribution of items in the container is within a threshold distribution.

In other embodiments, the controller may be configured to determine a third image of the first container at a second time, and may determine that the jam is cleared using the third image. The system may move to another container.

In some embodiments, the controller may be configured to determine a third image of the first container at a second time, and may determine that the jam is still present using the third image. The controller may generate a notification indicating the jam is still present at the first container. The jam may be manually cleared thereafter. In other embodiments, the system may attempt to clear the jam again using the rake arm instead of generating a notification.

Figure 7:
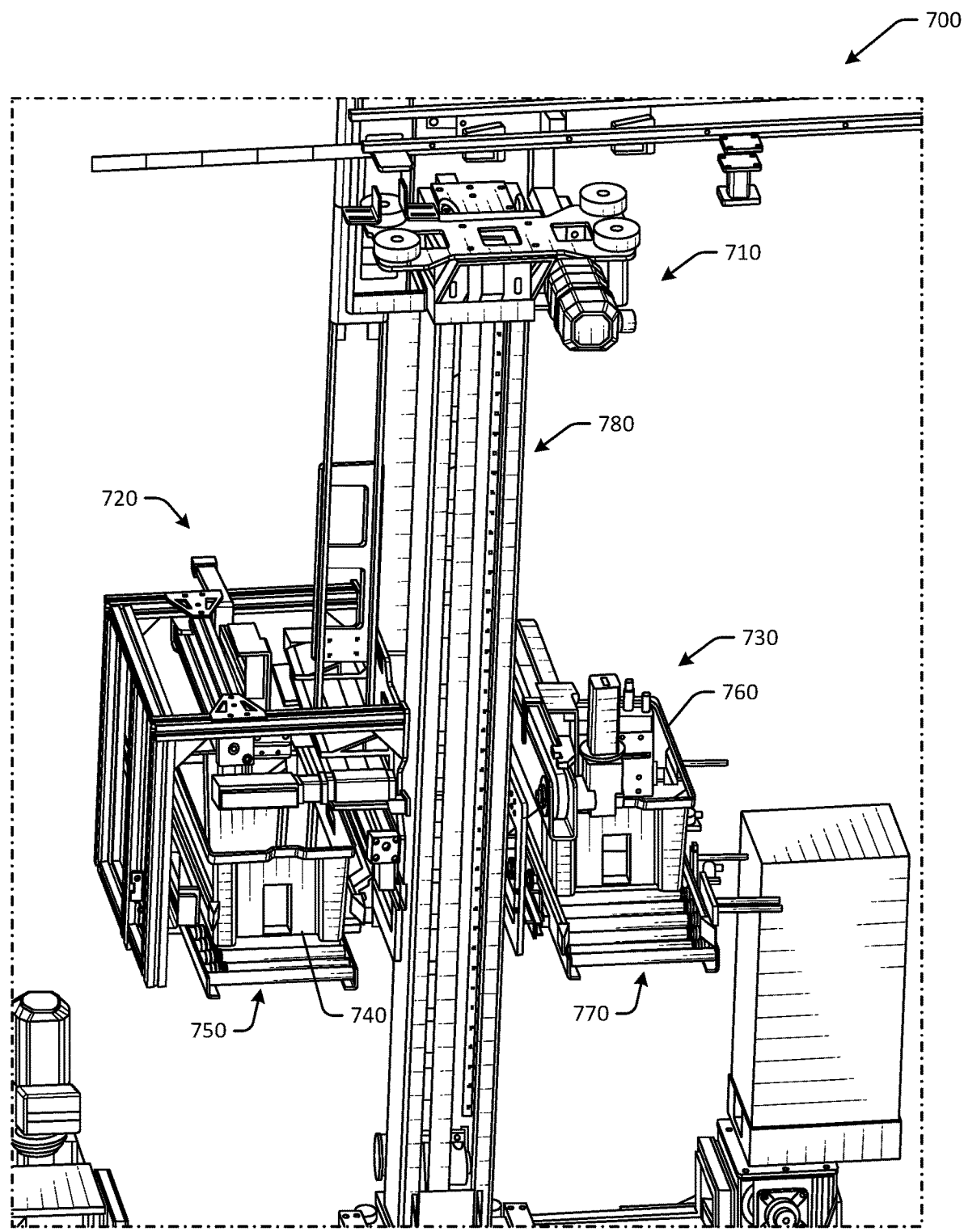
FIG. 7 is a schematic illustration of an automated item redistribution system for containers in accordance with one or more embodiments of the disclosure.

FIG. 7 is a schematic illustration of an automated item redistribution system 700 for containers in accordance with one or more embodiments of the disclosure. Other embodiments may include additional or fewer components. The illustration of FIG. 7 may not be to scale, and may not be illustrated to scale with respect to other figures. The automated item redistribution system illustrated in FIG. 7 may be the same automated item redistribution system discussed with respect to FIGS. 1-6.

In FIG. 7, the automated item redistribution system 700 is depicted in a rear view and may include one or more motors 710 that drive vertical movement of a first portion 720 of a shuttle and a second portion 730 of the shuttle. The first portion 720 may be a full container portion and the second portion 730 may be a replenishment portion. The first portion 720 may include one or more conveyors 750 configured to load and/or unload full containers, such as a full container 740. The second portion 730 may include one or more conveyors 770 configured to load and/or unload empty containers, such as an empty container 760.

During operation, the automated item redistribution system 700 may detect or otherwise determine that the full container 740 is full, and may load the full container 740 onto the conveyor 750 using the first portion 720. The shuttle may move laterally, and the automated item redistribution system 700 may cause the empty container 760 to be unloaded from the conveyor 770 into the container slot left empty due to removal of the full container 740.

Figure 8:
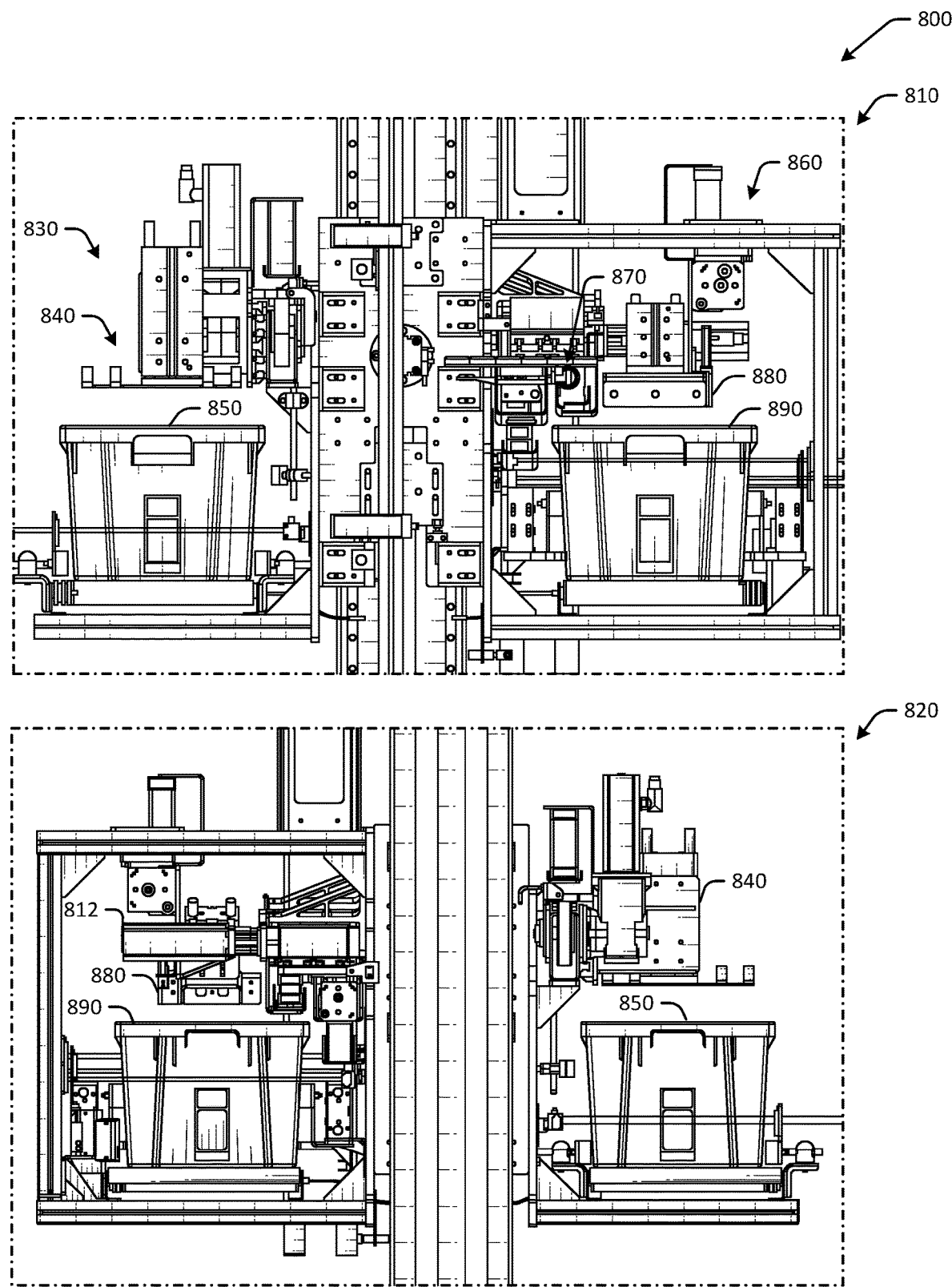
FIG. 8 is a schematic illustration of front and rear views of an automated item redistribution system for containers in accordance with one or more embodiments of the disclosure.

FIG. 8 is a schematic illustration of front and rear views of an automated item redistribution system 800 for containers in accordance with one or more embodiments of the disclosure. Other embodiments may include additional or fewer components. The illustration of FIG. 8 may not be to scale, and may not be illustrated to scale with respect to other figures. The automated item redistribution system illustrated in FIG. 8 may be the same automated item redistribution system discussed with respect to FIGS. 1-7.

In front view 810, a shuttle of the automated item redistribution system 800 is depicted having a first portion 830, which may be a replenishment module, and a second portion 860, which may be a full container module. The shuttle may work to automatically replace full containers in a container matrix with empty containers, such that a sortation process may continue. The shuttle may include hardware 840, such as motors, configured to move the shuttle vertically along a frame of the automated item redistribution system 800. The first portion 830 may include an empty container 850.

The second portion 860 may include a full container 890 that is removed from a container matrix. The second portion 860 may include a container gripper 880 configured to engage a handle or other structure of a container, and to lift the container to a horizontal orientation in instances where the container is angled in a container slot. The container gripper 880 may be configured to pull the container onto the conveyor of the second portion 860. The second portion 860 may include a rake arm 870 that may be configured to extend, rotate a head, and retract, so as to clear jams and/or redistribute items in a container more evenly.

In a rear view 820, the shuttle of the automated item redistribution system 800 is depicted. A pneumatic cylinder and/or servo motor 812, or other mechanical or electromechanical actuation component may be used to control actuation of the rake arm 880.

Figure 9:
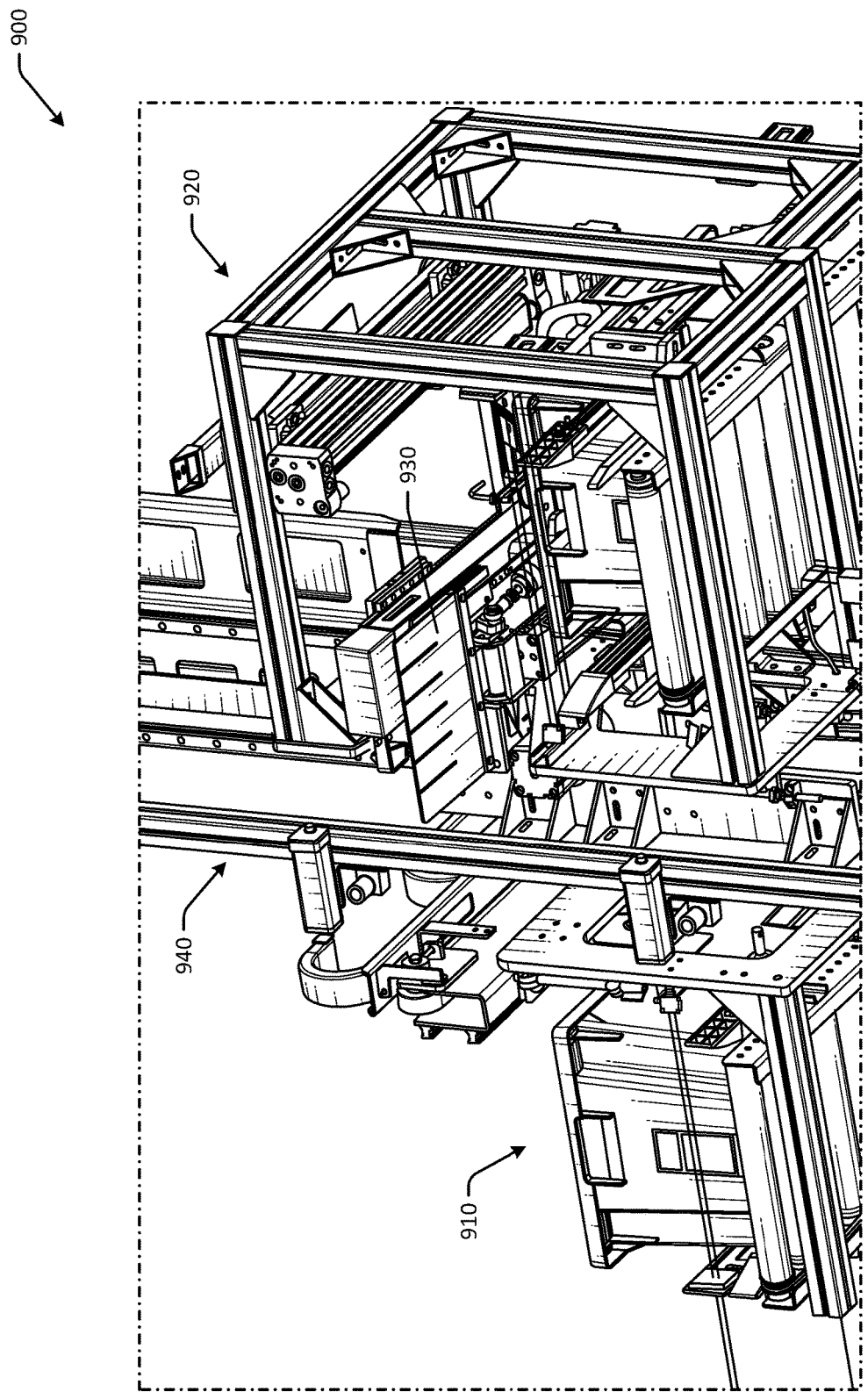
FIGS. 9-10 are schematic illustrations of a bottom perspective view and a top view of an automated item redistribution system for containers in accordance with one or more embodiments of the disclosure.
Figure 10:
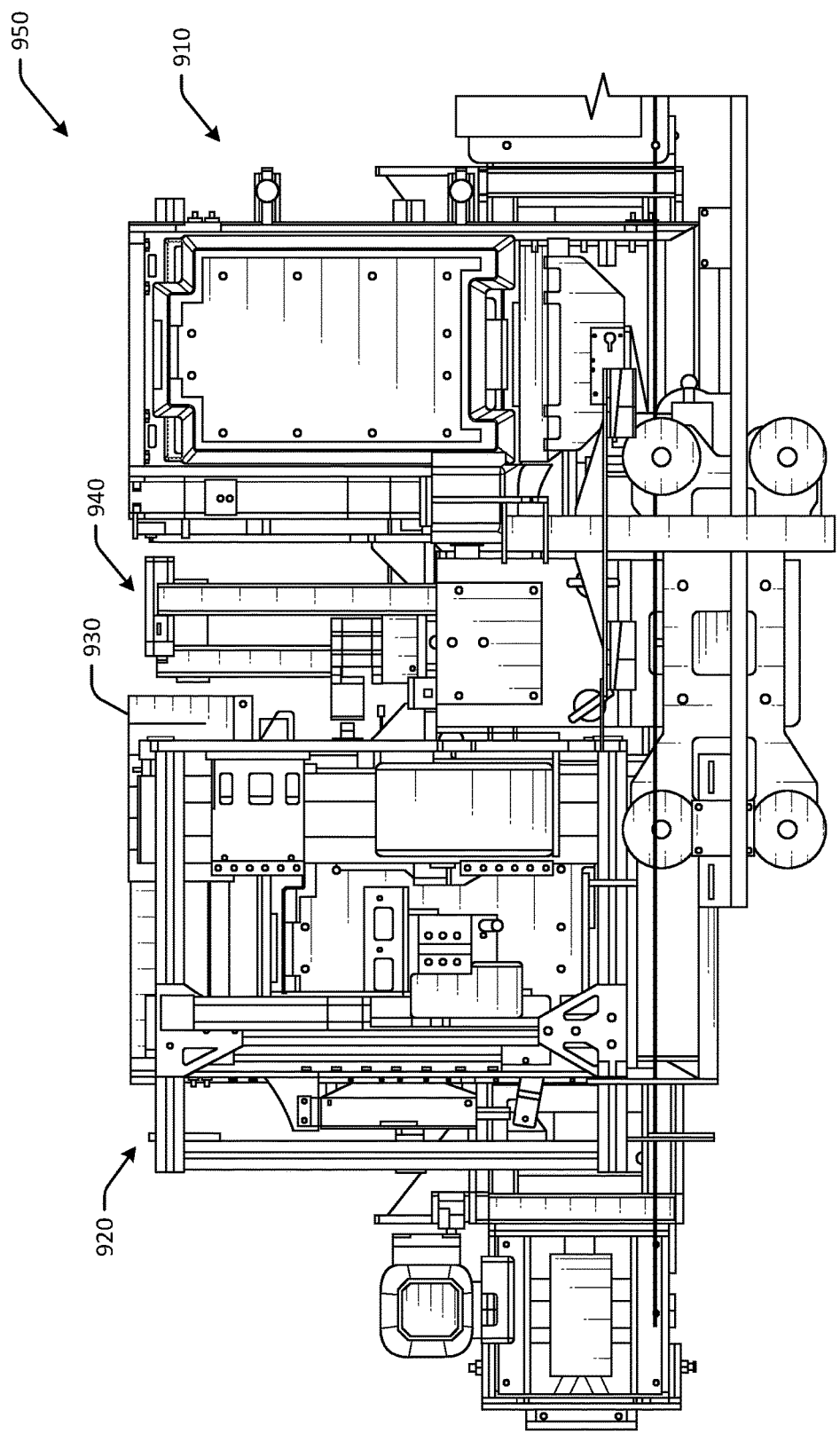

FIGS. 9-10 are schematic illustrations of a bottom perspective view and a top view of an automated item redistribution system for containers 900 in accordance with one or more embodiments of the disclosure. Other embodiments may include additional or fewer components. The illustration of FIGS. 9-10 may not be to scale, and may not be illustrated to scale with respect to other figures. The automated item redistribution system illustrated in FIGS. 9-10 may be the same automated item redistribution system discussed with respect to FIGS. 1-8.

In FIG. 9, a bottom perspective view of the automated item redistribution system for containers 900 is shown. In particular, a portion of a shuttle of the automated item redistribution system for containers 900 is depicted. In this orientation, a rake arm 930 is visible in a retracted position with its head in a horizontal orientation. The rake arm 930 may extend outward, rotate the head, and retract a number of times to clear jams and/or redistribute items in a container. The automated item redistribution system for containers 900 may include a replenishment module 910 that carries an empty container to replace full containers that have been extracted by a full container module 920. One or both the replenishment module 910 or full container module 920 may include individual conveyors for loading and/or unloading containers.

The automated item redistribution system for containers 900 may include a frame 940 along which the replenishment module 910 and/or full container module 920 may slide vertically. In some embodiments, the individual modules may move independent of one another, whereas in other embodiments, the individual modules may move along the frame in tandem. One or more cameras may be coupled to the frame 940. For example, a U-shaped or rectangular shaped bracket may be coupled to the frame 940, and the cameras may be coupled to the bracket.

FIG. 10 depicts a top view of the automated item redistribution system for containers 900. As depicted, the rake arm 930 may be coupled to a pneumatic cylinder, a servo motor, or other drive component to control motion of the rake arm 930. Similarly, one or more electric motors may be used to control vertical movement of the replenishment module 910 and/or full container module 920 along the frame 940, and another motor may be configured to control lateral movement of the shuttle along one or more rails adjacent to a container matrix. In the illustrated example, the replenishment module 910 may not include container removal hardware and/or a rake arm, thereby reducing costs and reducing weight of the shuttle.

One or more operations of the methods, process flows, or use cases of FIGS. 1-10 may have been described above as being performed by a user device, or more specifically, by one or more program module(s), applications, or the like executing on a device. It should be appreciated, however, that any of the operations of the methods, process flows, or use cases of FIGS. 1-10 may be performed, at least in part, in a distributed manner by one or more other devices, or more specifically, by one or more program module(s), applications, or the like executing on such devices. In addition, it should be appreciated that processing performed in response to the execution of computer-executable instructions provided as part of an application, program module, or the like may be interchangeably described herein as being performed by the application or the program module itself or by a device on which the application, program module, or the like is executing. While the operations of the methods, process flows, or use cases of FIGS. 1-10 may be described in the context of the illustrative devices, it should be appreciated that such operations may be implemented in connection with numerous other device configurations.

The operations described and depicted in the illustrative methods, process flows, and use cases of FIGS. 1-10 may be carried out or performed in any suitable order, such as the depicted orders, as desired in various example embodiments of the disclosure. Additionally, in certain example embodiments, at least a portion of the operations may be carried out in parallel. Furthermore, in certain example embodiments, less, more, or different operations than those depicted in FIGS. 1-10 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by the execution of computer-executable program instructions. Likewise, some blocks of the block diagrams and flow diagrams may not necessarily need to be performed in the order presented, or may not necessarily need to be performed at all, according to some embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Illustrative Computer Architecture

Figure 11:
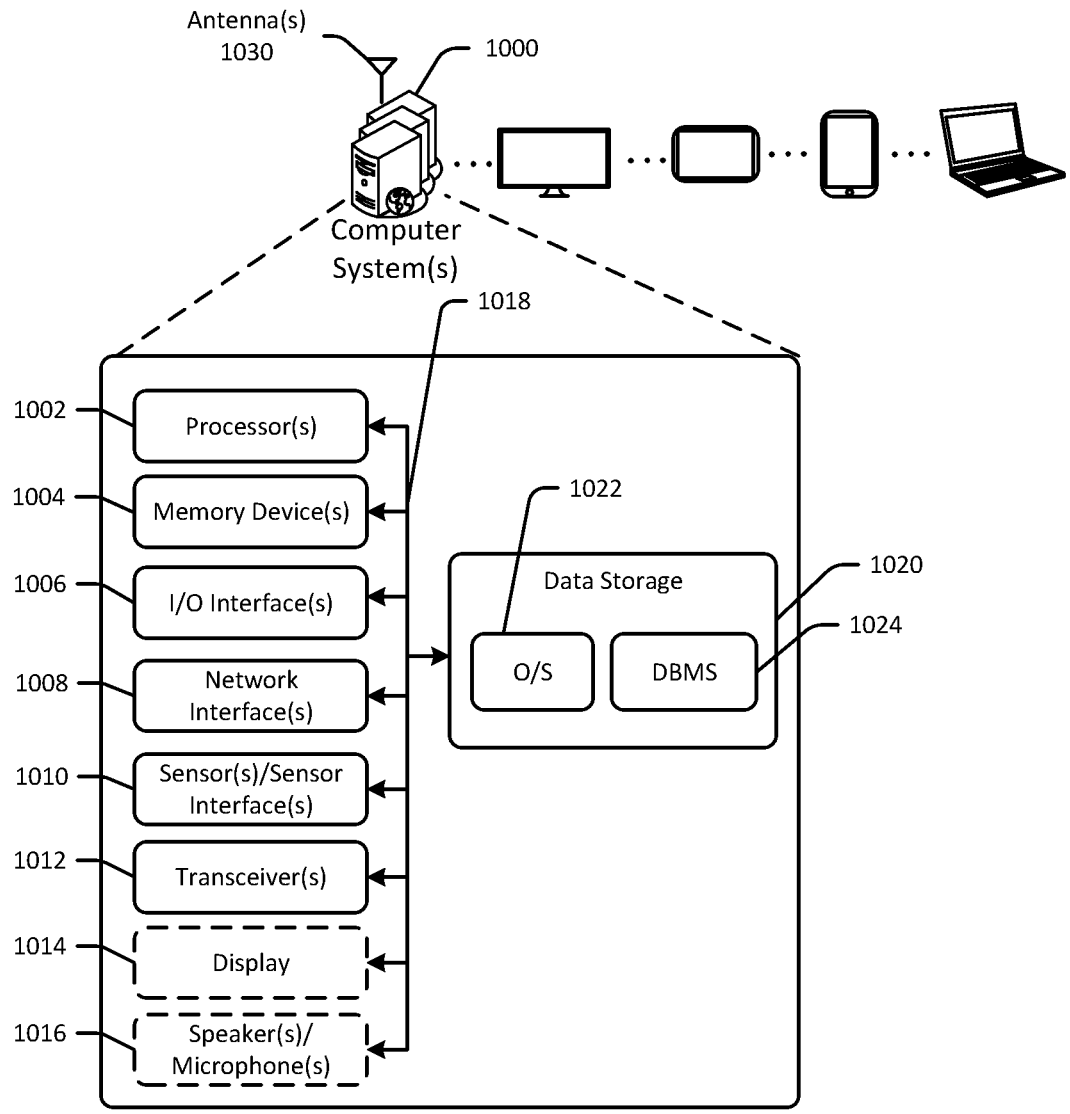
FIG. 11 schematically illustrates an example architecture of a computer system associated with an item sorting system in accordance with one or more embodiments of the disclosure.

FIG. 11 is a schematic block diagram of one or more illustrative computer system(s) 1000 in accordance with one or more example embodiments of the disclosure. The computer system(s) 1000 may include any suitable computing device including, but not limited to, a server system, a voice interaction device, a mobile device such as a smartphone, a tablet, an e-reader, a wearable device, or the like; a desktop computer; a laptop computer; a content streaming device; or the like. The computer system(s) 1000 may correspond to an illustrative device configuration for the controller(s) or computer system(s) of FIGS. 1-10.

The computer system(s) 1000 may be configured to communicate with one or more servers, user devices, or the like. The computer system(s) 1000 may be configured to control shuttles, modules, and/or other components of automated item redistribution systems.

The computer system(s) 1000 may be configured to communicate via one or more networks. Such network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computer system(s) 1000 may include one or more processors (processor(s)) 1002, one or more memory devices 1004 (also referred to herein as memory 1004), one or more input/output (I/O) interface(s) 1006, one or more network interface(s) 1008, one or more sensor(s) or sensor interface(s) 1010, one or more transceiver(s) 1012, one or more optional display(s) 1014, one or more optional microphone(s) 1016, and data storage 1020. The computer system(s) 1000 may further include one or more bus(es) 1018 that functionally couple various components of the computer system(s) 1000. The computer system(s) 1000 may further include one or more antenna(s) 1030 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1018 may include at least one of a system bus, a memory bus, an address bus, or a message bus, and may permit the exchange of information (e.g., data (including computer-executable code), signaling, etc.) between various components of the computer system(s) 1000. The bus(es) 1018 may include, without limitation, a memory bus or a memory controller, a peripheral bus, an accelerated graphics port, and so forth. The bus(es) 1018 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnect (PCI) architecture, a PCI-Express architecture, a Personal Computer Memory Card International Association (PCMCIA) architecture, a Universal Serial Bus (USB) architecture, and so forth.

The memory 1004 of the computer system(s) 1000 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 1004 may include multiple different types of memory such as various types of static random access memory (SRAM), various types of dynamic random access memory (DRAM), various types of unalterable ROM, and/or writeable variants of ROM such as electrically erasable programmable read-only memory (EEPROM), flash memory, and so forth. The memory 1004 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 1020 may include removable storage and/or non-removable storage including, but not limited to, magnetic storage, optical disk storage, and/or tape storage. The data storage 1020 may provide non-volatile storage of computer-executable instructions and other data. The memory 1004 and the data storage 1020, removable and/or non-removable, are examples of computer-readable storage media (CRSM) as that term is used herein.

The data storage 1020 may store computer-executable code, instructions, or the like that may be loadable into the memory 1004 and executable by the processor(s) 1002 to cause the processor(s) 1002 to perform or initiate various operations. The data storage 1020 may additionally store data that may be copied to the memory 1004 for use by the processor(s) 1002 during the execution of the computer-executable instructions. Moreover, output data generated as a result of execution of the computer-executable instructions by the processor(s) 1002 may be stored initially in the memory 1004, and may ultimately be copied to the data storage 1020 for non-volatile storage.

More specifically, the data storage 1020 may store one or more operating systems (O/S) 1022; one or more database management systems (DBMS) 1024; and one or more program module(s), applications, engines, computer-executable code, scripts, or the like. Some or all of these module(s) may be sub-module(s). Any of the components depicted as being stored in the data storage 1020 may include any combination of software, firmware, and/or hardware. The software and/or firmware may include computer-executable code, instructions, or the like that may be loaded into the memory 1004 for execution by one or more of the processor(s) 1002. Any of the components depicted as being stored in the data storage 1020 may support functionality described in reference to corresponding components named earlier in this disclosure.

The data storage 1020 may further store various types of data utilized by the components of the computer system(s) 1000. Any data stored in the data storage 1020 may be loaded into the memory 1004 for use by the processor(s) 1002 in executing computer-executable code. In addition, any data depicted as being stored in the data storage 1020 may potentially be stored in one or more datastore(s) and may be accessed via the DBMS 1024 and loaded in the memory 1004 for use by the processor(s) 1002 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like.

The processor(s) 1002 may be configured to access the memory 1004 and execute the computer-executable instructions loaded therein. For example, the processor(s) 1002 may be configured to execute the computer-executable instructions of the various program module(s), applications, engines, or the like of the computer system(s) 1000 to cause or facilitate various operations to be performed in accordance with one or more embodiments of the disclosure. The processor(s) 1002 may include any suitable processing unit capable of accepting data as input, processing the input data in accordance with stored computer-executable instructions, and generating output data. The processor(s) 1002 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1002 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1002 may be capable of supporting any of a variety of instruction sets.

Referring now to other illustrative components depicted as being stored in the data storage 1020, the O/S 1022 may be loaded from the data storage 1020 into the memory 1004 and may provide an interface between other application software executing on the computer system(s) 1000 and the hardware resources of the computer system(s) 1000. More specifically, the O/S 1022 may include a set of computer-executable instructions for managing the hardware resources of the computer system(s) 1000 and for providing common services to other application programs (e.g., managing memory allocation among various application programs). In certain example embodiments, the O/S 1022 may control execution of the other program module(s). The O/S 1022 may include any operating system now known or which may be developed in the future including, but not limited to, any server operating system, any mainframe operating system, or any other proprietary or non-proprietary operating system.

The DBMS 1024 may be loaded into the memory 1004 and may support functionality for accessing, retrieving, storing, and/or manipulating data stored in the memory 1004 and/or data stored in the data storage 1020. The DBMS 1024 may use any of a variety of database models (e.g., relational model, object model, etc.) and may support any of a variety of query languages. The DBMS 1024 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computer system(s) 1000 is a mobile device, the DBMS 1024 may be any suitable lightweight DBMS optimized for performance on a mobile device.

Referring now to other illustrative components of the computer system(s) 1000, the input/output (I/O) interface(s) 1006 may facilitate the receipt of input information by the computer system(s) 1000 from one or more I/O devices as well as the output of information from the computer system(s) 1000 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computer system(s) 1000 or may be separate. The I/O devices may further include, for example, any number of peripheral devices such as data storage devices, printing devices, and so forth.

The I/O interface(s) 1006 may also include an interface for an external peripheral device connection such as universal serial bus (USB), FireWire, Thunderbolt, Ethernet port or other connection protocol that may connect to one or more networks. The I/O interface(s) 1006 may also include a connection to one or more of the antenna(s) 1030 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, a ZigBee network, etc.

The computer system(s) 1000 may further include one or more network interface(s) 1008 via which the computer system(s) 1000 may communicate with any of a variety of other systems, platforms, networks, devices, and so forth. The network interface(s) 1008 may enable communication, for example, with one or more wireless routers, one or more host servers, one or more web servers, and the like via one or more networks.

The antenna(s) 1030 may include any suitable type of antenna depending, for example, on the communications protocols used to transmit or receive signals via the antenna(s) 1030. Non-limiting examples of suitable antennas may include directional antennas, non-directional antennas, dipole antennas, folded dipole antennas, patch antennas, multiple-input multiple-output (MIMO) antennas, or the like. The antenna(s) 1030 may be communicatively coupled to one or more transceivers 1012 or radio components to which or from which signals may be transmitted or received.

As previously described, the antenna(s) 1030 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(s) 1030 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(s) 1030 may be configured to transmit or receive radio frequency signals within any suitable frequency range forming part of the unlicensed portion of the radio spectrum.

The antenna(s) 1030 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1012 may include any suitable radio component(s) for—in cooperation with the antenna(s) 1030—transmitting or receiving radio frequency (RF) signals in the bandwidth and/or channels corresponding to the communications protocols utilized by the computer system(s) 1000 to communicate with other devices. The transceiver(s) 1012 may include hardware, software, and/or firmware for modulating, transmitting, or receiving—potentially in cooperation with any of antenna(s) 1030—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1012 may further include hardware, firmware, or software for receiving GNSS signals. The transceiver(s) 1012 may include any known receiver and baseband suitable for communicating via the communications protocols utilized by the computer system(s) 1000. The transceiver(s) 1012 may further include a low noise amplifier (LNA), additional signal amplifiers, an analog-to-digital (A/D) converter, one or more buffers, a digital baseband, or the like.

The sensor(s)/sensor interface(s) 1010 may include or may be capable of interfacing with any suitable type of sensing device such as, for example, inertial sensors, force sensors, thermal sensors, photocells, and so forth. Example types of inertial sensors may include accelerometers (e.g., MEMS-based accelerometers), gyroscopes, and so forth.

The optional display(s) 1014 may be configured to output light and/or render content. The optional speaker(s)/microphone(s) 1016 may be any device configured to receive analog sound input or voice data.

It should be appreciated that the program module(s), applications, computer-executable instructions, code, or the like depicted in FIG. 11 as being stored in the data storage 1020 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computer system(s) 1000, and/or hosted on other computing device(s) accessible via one or more networks, may be provided to support functionality provided by the program module(s), applications, or computer-executable code depicted in FIG. 11 and/or additional or alternate functionality. Further, functionality may be modularized differently such that processing described as being supported collectively by the collection of program module(s) depicted in FIG. 11 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module(s) depicted in FIG. 11 may be implemented, at least partially, in hardware and/or firmware across any number of devices.

It should further be appreciated that the computer system(s) 1000 may include alternate and/or additional hardware, software, or firmware components beyond those described or depicted without departing from the scope of the disclosure. More particularly, it should be appreciated that software, firmware, or hardware components depicted as forming part of the computer system(s) 1000 are merely illustrative and that some components may not be present or additional components may be provided in various embodiments. While various illustrative program module(s) have been depicted and described as software module(s) stored in the data storage 1020, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module(s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A container monitoring system comprising:
    an item sortation machine comprising an array of containers arranged in a first row and a second row, wherein the item sortation machine delivers items to individual containers using respective chutes aligned with the individual containers;
    a shuttle configured to translate adjacent to an exterior side of the item sortation machine;
    a first camera configured to image containers in the first row;
    a second camera configured to image containers in the second row;
    a first container receptacle portion configured to receive containers, wherein the first container receptacle portion comprises an upper portion;
    a container pulling mechanism disposed at a middle of the upper portion of the first container receptacle portion, the container pulling mechanism configured to pull individual containers out of the array of containers; and
    a rake arm comprising a telescoping portion and a head portion, wherein the telescoping portion is configured to extend over a container in the array of containers, and the head portion is configured to rotate from a flat position to an angled position, and wherein the rake arm is disposed adjacent to the container pulling mechanism and is offset from the middle of the upper portion;
    wherein the container monitoring system is configured to clear jams in individual containers of the array of containers using the rake arm.

2. The container monitoring system of claim 1, further comprising:
    a controller configured to:
        determine a first image of a first container at a first time using the first camera;
        determine a second image of a second container at the first time using the second camera;
        detect a jam at the first container using the first image;
        cause the rake arm to extend from a retracted position to an extended position, wherein the head portion of the rake arm is disposed at a distal end of the first container in the extended position;
        cause the head portion to move to the angled position; and
        cause the rake arm to retract to the retracted positon while the head portion is in the angled position.

3. The container monitoring system of claim 2, wherein the controller is further configured to:
    determine a third image of the first container at a second time;

determine that the jam is still present using the third image; and
generate a notification indicating the jam is still present at the first container.

4. The container monitoring system of claim 1, wherein the first container receptacle portion is configured to move vertically along a frame of the shuttle; and
  wherein a first position of the first camera is fixed, and a second position of the second camera is fixed.

5. A system comprising:
  a shuttle configured to move adjacent to an array of containers arranged in a first row and a second row, the array of containers comprising a first container in the first row and a second container in the second row;
  a first camera configured to image containers in the first row;
  a second camera configured to image containers in the second row;
  a first container receptacle portion configured to receive containers; and
  a rake arm comprising a telescoping portion and a head portion, wherein the telescoping portion is configured to extend over a container in the array of containers, and the head portion is configured to rotate from a flat position to an angled position;
  wherein the system is configured to clear jams in individual containers of the array of containers using the rake arm.

6. The system of claim 5, wherein the first container receptacle portion comprises an upper portion, the system further comprising:
  a container pulling mechanism disposed at a middle of the upper portion of the first container receptacle portion, the container pulling mechanism configured to pull individual containers out of the array of containers;
  wherein the rake arm is disposed adjacent to the container pulling mechanism and is offset from the middle of the upper portion.

7. The system of claim 6, wherein a width of the head portion is equal to or greater than half a width of the first container.

8. The system of claim 5, further comprising:
  a second container receptacle portion configured to receive containers, the second container receptacle portion disposed adjacent to the first container receptacle portion; and
  a U-shaped bracket coupled to a frame of the shuttle and positioned between the first container receptacle portion and the second container receptacle portion;
  wherein the first camera and the second camera are coupled to the U-shaped bracket.

9. The system of claim 5, further comprising:
  a controller configured to:
    determine a first image of a first container at a first time using the first camera;
    determine a second image of a second container at the first time using the second camera;
    detect a jam at the first container using the first image;
    cause the rake arm to extend from a retracted position to an extended position, wherein the head portion of the rake arm is disposed at a distal end of the first container in the extended position;
    cause the head portion to move to the angled position; and
    cause the rake arm to retract to the retracted positon while the head portion is in the angled position.

10. The system of claim 9, wherein the controller is further configured to:
  determine a third image of the first container at a second time;
  determine that the jam is still present using the third image; and
  generate a notification indicating the jam is still present at the first container.

11. The system of claim 9, wherein the controller is further configured to:
  cause the first container receptacle portion to move to a vertical position aligned with the first container.

12. The system of claim 5, wherein the angled position is angled at least 60 degrees relative to the flat position.

13. The system of claim 5, wherein the first container receptacle portion is configured to move vertically along a frame of the shuttle; and
  wherein a first position of the first camera is fixed, and a second position of the second camera is fixed.

14. The system of claim 5, wherein the head portion comprises at least one of: a rubber flap, brush bristles, or a composite material.

15. A method comprising:
  determining, by a computer system using a first camera of a container monitoring system, a first image of a first container at a first time, wherein the first container is disposed in an array of containers;
  determining, using a second camera of the container monitoring system, a second image of a second container at the first time, wherein the second container is disposed in the array of containers;
  detecting a jam at the first container using the first image;
  causing a rake arm of the container monitoring system to extend from a retracted position to an extended position, wherein a head portion of the rake arm is disposed at a distal end of the first container in the extended position;
  causing the head portion to rotate from a flat position to an angled position; and
  causing the rake arm to retract to the retracted positon while the head portion is in the angled position.

16. The method of claim 15, further comprising:
  determining a third image of the first container at a second time;
  determining that the jam is still present using the third image; and
  generating a notification indicating the jam is still present at the first container.

17. The method of claim 15, further comprising:
  determining a third image of the first container at a second time;
  determining that the jam is cleared using the third image.

18. The method of claim 15, further comprising:
  causing a shuttle of the container monitoring system to move laterally adjacent to the array of containers.

19. The method of claim 18, further comprising:
  retrieving the first container from the array of containers using a container pulling mechanism coupled to the shuttle.

20. The method of claim 15, further comprising:
  causing the first container receptacle portion to move to a vertical position aligned with the first container.

* * * * *